United States Patent Office 3,386,974
Patented June 4, 1968

3,386,974
OLEFIN COPOLYMERS
Janine Ourgaud, Paris, France, assignor to Societe Nationale des Petroles d'Aquitaine Tour Aquitaine, Courbevoie, France
No Drawing. Filed June 2, 1966, Ser. No. 554,692
Claims priority, application France, June 9, 1965, 20,032
6 Claims. (Cl. 260—79.5)

ABSTRACT OF THE DISCLOSURE

The present invention relates to a new type of olefine copolymers, in particular to copolymers formed by α-olefines with polythioether-dienes. Among the new copolymers, the invention especially concerns the ternary polymers obtained from ethylene, an aliphatic α-olefine, and a polythioether, the molecule of which contains —$CH_2S$— groups and two alkylene groups. The products primarily concerned in the present invention are high-molecular, substantially linear, amorphous unsaturated and vulcanizable polymers.

The ternary polymers most valuable according to the term of the invention are obtained from monomers, namely ethylene, an aliphatic α-olefine of the general formula R—CH=$CH_2$, the alkyl group of which contains 1 to 6 carbon atoms, and a polythioetherdiene.

Background of the invention

It is known to prepare rubber-like copolymers from ethylene and α-olefines, for example from ethylene and propylene, but these materials have the drawback of being very difficult to vulcanize by reason of their saturation. In order to obtain elastomers which are vulcanizable by conventional means, it is necessary for the molecule to have a certain degree of unsaturation. The method of the present invention allows to achieve a sufficient degree of unsaturation in the new polymers to render possible the conventional vulcanization with sulphur, as well as the vulcanization with the aid of free-radical producing substances, in particular peroxides.

The process according to the invention makes it possible to obtain elastomers which retain the advantageous properties of ethylene-propylene rubbers, namely an exceptionally good resistance against ozone, weather conditions, heat and chemicals, in conjunction with good mechanical properties. These advantages are achieved by the selection and the carefully controlled concentration of the component which ensures the requisite degree of unsaturation in the molecule; in this respect, the products according to the invention have particularly advantageous qualities when they comprise at least one double bond for every 50 ethylene-α-olefine units, more especially for every 50 ethylene-propylene units. Moreover, the process of the invention allows a very regular distribution of the unsaturation centres within the ternary copolymer, which makes possible the complete and uniform cross-linking of the molecules during vulcanization. In fact, the invented process yields ternary copolymers which, prior to vulcanization, are characterised by a substantially amorphous state, indicating a random distribution of the monomers and the absence of sequences constituted by a given monomer. Owing to these qualities, the new copolymers, after vulcanization, yield products which can be advantageously used in the manufacture of various articles, for example electric cables, conveyor belts, tubing sheaths, tyres and others.

The new process consists in copolymerising ethylene with one or several α-olefines, especially propylene, and a certain amount of a polythioether-diene, in the presence of a Ziegler-type catalyst.

The polythioethers employed in the process of the present invention are constituted by a chain of —$CH_2S$— groups, to which an alkylene radical is linked on either side. They correspond to the formula $$R—CH_2S(CH_2S)_n—CH_2—R'$$

in which the hydrocarbon residues R—$CH_2$— and R'—$CH_2$ represent alkylene radicals.

R and R' may be identical or different; they may comprise 1 to 30 carbon atoms and have for example the following configurations:

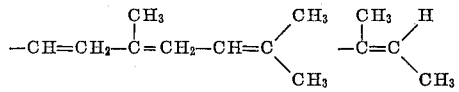

The number $n$ of the —$CH_2S$ groups is in general between 2 and 7. A non-limiting example of such products suitable for use according to the invention is the (1-methyl 1-propenyl)-polythiomethylene-(2-methyl 2-butenyl)

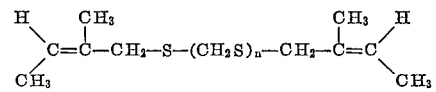

These polythioether dienes can undergo homo- or copolymerisation with the ethylene, optionally in mixture with an α-olefine. In these copolymerization reactions, one of the two double bonds of the polythioether-diene participates in the polymerization, whilst the second double bond remains available for other reactions, for example cross-linking.

The copolymerization according to the invention is catalysed by known systems, comprising an alkyl compound of one or several metals of groups I, II or III of the periodic system of classification of the elements (A) and a halogen compound of a transition metal of one of groups IV, V or VI (B). Catalyst systems of this kind, formed for example of aluminum alkylates and halides of Ti, Zr, V, Mo, W, etc., have been described for example in the French patent specifications Nos. 1,121,962 and 1,162,882.

To form the catalyst system, the compounds A may be mixed with the compounds (B) before being introduced into the reactor; the catalyst can thus be preformed and "aged" prior to its introduction into the mixture to be polymerised continuously or in batches. The compounds A and B can also be introduced separately.

The catalyst system preferably comprises such quantities of the compounds A and B, that the molar ratio between the metal of A and the transition metal of B is between 1 and 30.

The polymerization is carried out in the presence of a solvent or with an excess of one of the monomers to form the liquid phase of the reaction medium. The solvents coming into consideration for this purpose are those normally employed in polymerization or copolymerization reactions of olefines, namely aliphatic, cycloaliphatic or aromatic hydrocarbons, for example heptane, cyclohexane, benzene, ethylbenzene or mixtures of such solvents. It is also possible to use halogenated hydrocarbons which are inert with respect to the catalyst, for example chlorobenzene or tetrachloroethylene.

The copolymerization is generally carried out in the temperature range of from —80° C. to +110° C., the preferred range being between —30°C. to +50° C.

Although the pressures normally applied are of the order of between 1 and 10 atm., it is possible and sometimes even desirable to operate at higher or lower pressures. In particular, it may be advantageous to operate at a temperature and a pressure at which one or several of the monomers present are liquid during the reaction, thus acting as dispersing media.

The polythioether-diene added according to the invention, is generally introduced in a single portion into the reactor, either as such or dissolved in a solvent, prior to the introduction of the catalyst system. Nevertheless, all or a part of this resinous compound can be introduced during the polymerization, continuously or discontinuously.

The process according to the invention can be carried out continuously; in this case, the solvent, the monomers and the catalyst system are continuously fed to a polymerization zone, in such rates, that their residence time in this zone be sufficiently long to obtain the desired concentration of copolymers in the reaction mixture. In general, the requisite residence time diminishes with the increase in the concentration of monomers and catalysts in the feed mixture.

In the new products according to the invention, more especially in the ternary polymers, the lower limit of ethylene content is not critical, but the upper limit should preferably be 75 mol-percent, in order to avoid a polyethylene-type crystalline structure. As regards the concentration of $\alpha$-olefines in the ternary polymers, in the amorphous state, it may normally vary between 5 and 75 mol-percent. The total diene, i.e. polythioether content of the ternary polymer, may vary between 0.1 and 20 mol-percent. Generally speaking, the composition of the copolymers according to the invention may vary between wide limits in dependence of the composition of the monomer mixture.

The length of the copolymerization period, which depends primarily of the temperature and of the nature of the catalyst system, generally varies between 1 hour and 8 hours.

At the end of the operation, the catalyst is destroyed in a known manner, and the reaction medium is subjected to an in vacuo steam distillation to eliminate the solvent and unconverted monomers, at a temperature in the range of from 30 to 60° C., and finally the copolymer or "gum" obtained is dried in vacuum at about 40° C.

The gum thus obtained has a sufficient degree of unsaturation to be suitable for vulcanization by conventional methods applicable to unsaturated elastomers. Its processing can be carried out with the means commonly available in the rubber industry.

The following example is intended to illustrate the invention without in any way liimting its scope.

EXAMPLE

The reaction is carried out in a cylindrical glass reactor of 1000 cm.³ capacity, equipped with a stirrer, a thermometer, a dropping funnel for introducing the diene, two feed funnels for introducing the catalysts, a condenser with a gas outlet pipe, a gas feed pipe terminating (near the bottom of the reactor) in a crown provided with orifices to ensure a better diffusion of the gaseous mixture within the solvent.

This apparatus is placed in a bath whose temperature is maintained at 30°±1° C. by means of a thermostat.

The monomers, after being rid of impurities such as moisture and air, are mixed before introduction into the reaction medium; their respective rates of flow are controlled by rotameters and counters.

600 cm.³ of previously dried and degassed heptane are then introduced in the reactor which is being swept by a stream of nitrogen.

The dropping funnels, likewise swept by nitrogen, respectively receive 2.7 millimols of $VOCl_3$ in 60 cm.³ heptane, 14.8 millimols of $(C_2H_5)_2AlCl$ completed to 50 cm.³ with heptane and 7.2 g. of (1-methyl 1-propenyl)-polythiomethylene-(2-methyl 2-butenyl) having an average content of 3.5 groups —$CH_2S$— per mole, in 100 cm.³ of heptane.

The nitrogen flow is stopped and a mixture of gaseous ethylene and propylene is fed to the reaction vessel at a rate of 105 standard litres/hour, the propylene/ethylene volume ratio being equal to 4.

After 10 minutes, the catalyst components and the diene are introduced separately drop by drop, in the course of 40 minutes.

The course of the reaction and the rate of absorption of the gases can be followed by reading the temperature and the meters at the inlet and at the outlet.

The reaction is stopped at the end of 80 minutes, by introducing water to destroy the catalyst.

The reaction mixture is rid of the solvent by steam distillation in vacuum, at 50° C.

There are obtained 18 grams of a slightly rubbery product.

Similar results were obtained with polythioether dienes having in total respectively 3.1, 3.6 and 3.97 groups —$CH_2S$— per mole (that is $n=2.1$, 2.6 and 2.97) while R and R' were respectively:

| R | R' |
|---|---|
| methylene | ethenyle |
| ethenyle | ethenyle |
| propenyle | ethenyle |
| isopropenyle | ethenyle |
| butenyl-n | ethenyle |
| isobutenyl | ethenyle |
| pentenyl(methyl-butenyl) | ethenyle |
| pentenyl(methyl-iso-butenyl) | ethenyle |
| hexenyl-n (alpha) | ethenyle |
| hexenyl-(2-methyl-pentenyl) | ethenyle |
| butenyl-n | methylene |
| butenyl-n | propenyl |
| butenyl-n | isopropenyl |
| butenyl-n | butenyl-n |
| butenyl-n | isobutenyl |
| butenyl-n | hexenyl-n |

I claim:

1. A substantially, amorphous, linear sulfur vulcanizable unsaturated polymer of ethylene, an aliphatic $\alpha$-olefine of the formula R—$CH_2$=$CH_2$ wherein R is an alkyl of from 1 to 6 carbon atoms and a polythioetherdiene of the formula $R'CH_2S(CH_2S)_nCH_2R''$ wherein R' and R'' are alkenyl groups of from 1 to 30 carbon atoms and $n$ is an integer of from 2 to 7.

2. A polymer according to claim 1 wherein the aliphatic $\alpha$-olefine is propylene.

3. A polymer according to claim 2 wherein the polymer has from 5 to 75 mole percent of propylene, from 0.1 to 20 mole percent of polythioetherdiene and the remaining balance of ethylene.

4. A polymer according to claim 1 wherein the polythioetherdiene has the formula $$CH_3CH=\underset{\underset{CH_3}{|}}{C}-CH_2S(CH_2S)_n-CH_2\underset{\underset{CH_3}{|}}{C}=CH-CH_3$$

wherein $n$ is the integer 2 or 3.

5. A polymer according to claim 4 wherein the aliphatic $\alpha$-olefine is propylene.

6. A polymer according to claim 1 which is hardened by vulcanization with sulfur.

References Cited

UNITED STATES PATENTS 2,563,383   8/1951   Vaughan et al. _____ 260—79.7
2,664,414   12/1953  Morris et al. _____ 260—79.7
3,335,119   8/1967   D'Alelio _____ 260—79.7

JOSEPH L. SHOFER, *Primary Examiner.*

D. K. DENENBERG, *Assistant Examiner.*